(12) United States Patent
Birckigt et al.

(10) Patent No.: US 6,938,409 B2
(45) Date of Patent: Sep. 6, 2005

(54) METHOD FOR REDUCING PARTICLE EMISSIONS CONTAINING CARBON OF DIESEL MOTORS AND CORRESPONDING SYSTEM

(75) Inventors: Rudolf Birckigt, Neunkirchen (DE); Thomas Hammer, Hemhofen (DE); Tetsuo Kishimoto, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/432,270

(22) PCT Filed: Nov. 20, 2001

(86) PCT No.: PCT/DE01/04347

§ 371 (c)(1),
(2), (4) Date: May 21, 2003

(87) PCT Pub. No.: WO02/42615

PCT Pub. Date: May 30, 2002

(65) Prior Publication Data

US 2004/0079631 A1 Apr. 29, 2004

(30) Foreign Application Priority Data

Nov. 21, 2000 (DE) .......................................... 100 57 862
Jun. 22, 2001 (DE) .......................................... 101 30 163

(51) Int. Cl.$^7$ ................................................ F01N 3/00
(52) U.S. Cl. ............................. 60/275; 60/274; 60/286; 60/297; 60/303; 422/186.03; 422/186.04; 422/186.1
(58) Field of Search .......................... 60/274, 275, 286, 60/295, 297, 300, 301, 303; 422/186.03, 186.04, 174, 182, 186.1

(56) References Cited

U.S. PATENT DOCUMENTS

| 5,263,317 | A | * | 11/1993 | Watanabe et al. | ............. 60/275 |
| 5,715,677 | A | * | 2/1998 | Wallman et al. | ............. 60/274 |
| 5,827,407 | A | * | 10/1998 | Wang et al. | ................. 204/164 |
| 6,038,854 | A | * | 3/2000 | Penetrante et al. | ........... 60/297 |
| 6,119,455 | A | * | 9/2000 | Hammer et al. | ............. 60/301 |
| 6,185,930 | B1 | * | 2/2001 | Lepperhoff et al. | ........... 60/274 |
| 6,474,060 | B2 | * | 11/2002 | Khair | .......................... 60/275 |
| 6,660,068 | B1 | * | 12/2003 | Garner et al. | ................. 95/283 |
| 6,772,584 | B2 | * | 8/2004 | Chun et al. | ................... 60/275 |

FOREIGN PATENT DOCUMENTS

| DE | 2146228 | 3/1973 |
| DE | 3424196 | 8/1985 |
| DE | 3638203 | 5/1988 |

(Continued)

OTHER PUBLICATIONS

Müller et al., "Reactor For Decomposing Soot and Other Harmful Substances Contained In Flue Gas", International Symposium on High Pressure Low Temperature Plasma Chemistry, vol. 2, 2000, pp. 340–344.

Müller et al., "Spatial and Temporal Morphology of Dielectric Barrier Discharges Used For Decomposition of NO", pp. 731–736.

(Continued)

*Primary Examiner*—Binh Q. Tran
(74) *Attorney, Agent, or Firm*—Staas & Halsey LLP (57) ABSTRACT

Exhaust gas amitted from a diesel engine flows through a ceramic soot filter in which particles contained in the exhaust are deposited and oxidized to regenerate the filter. The filter is regenerated by non-thermal, electric surface creeping discharge on filter surfaces covered with particles. In addition, nitrogen oxides may be reduced by selective catalytic reduction. The system is designed to ensure operation reliability and environmental compatibility.

39 Claims, 7 Drawing Sheets

U.S. PATENT DOCUMENTS

| | | |
|---|---|---|
| DE | 4303586 | 8/1993 |
| DE | 19534950 | 3/1997 |
| DE | 19717890 | 4/1999 |
| DE | 19826831 | 10/1999 |
| DE | 10007130 | 5/2001 |
| EP | 0341832 | 11/1989 |
| EP | 0627263 | 12/1994 |
| EP | 0635625 | 1/1995 |
| EP | 0731875 | 9/1996 |
| EP | 0824376 | 2/1998 |
| EP | 0332609 | 9/1999 |
| FR | 2771449 | 5/1999 |
| WO | 91/03631 | 3/1991 |
| WO | 98/48922 | 11/1998 |
| WO | 99/38603 | 8/1999 |
| WO | 00/43102 | 7/2000 |
| WO | WO 00/43102 * 7/2000 | ............ 60/275 |

OTHER PUBLICATIONS

Müller et al., "Investigation of the Electrical and Optical Properties of Dielectric Barrier Discharges", Seventh International Suym,posium on the Science & Technology of Light Sources, 1995, pp. 171–172.

Pietsch et al., "Some Properties of Different Types of Dielectric Barrier Discharges for Ozone Production", pp 299–303.

Pietsch, G.J.., "Properties of Dielectric Barrier Discharges In Different Arrangements", APP Spring Meeting, 2001, pp 155–158.

Braun et al., "Microdischarges in Air–Fed Ozonizers", J. Phy. D: Appl. Phys., vol. 24, 1991, pp. 564–572.

Gellert et al., "UV–Generation in Dielectric Barrier Discharges", Contr. Plasma Phys., vol. 31, 1991 pp. 247–259.

Kogelschatz et al., "Dielectric–Barrier Discharges Principle and Applications", Intl. Conf. on Phenomena in Ionized Gases, 1997, pp. 1–20.

Penetrante et al., Feasibility of Plasma Aftertreatment for Simultaneous Control of $No_x$ and Particulates, Society of Automotive Engineers, 1999 pp. 1–6.

"Plasma Exhaust Treatment", www.dieselnet.com, 2000, 11 pp.

* cited by examiner

METHOD FOR REDUCING PARTICLE EMISSIONS CONTAINING CARBON OF DIESEL MOTORS AND CORRESPONDING SYSTEM

CROSS REFERENCE TO RELATED APPLICATIONS

This application is based on and hereby claims priority to German Patent Application Nos. 100 57 862.4 and 101 30 163.4 filed on November 2000 and Jun. 22, 2001, respectively, the contents of which are hereby incorporated by reference.

BACKGROUND OF THE INVENTION

1. Field of the Invention

The invention relates to a method for reducing the level of carbon-containing particle emissions from diesel engines, in which the exhaust gas emitted by the engine flows through a filter, the particles contained in the exhaust gas are separated out at filter surfaces, and in which the particles which have been separated out are oxidized in order for the filter to be regenerated. In addition, the invention also relates to an associated system for carrying out the method, having a ceramic particulate filter and means for oxidizing the particles which are separated out at the ceramic filter.

2. Description of the Related Art

Recent studies have shown that particulates which reach the lungs are harmful to health and possibly even carcinogenic. However, in particular the direct injection diesel engines used for passenger automobiles, which are of interest for reasons of fuel economy, emit particles which reach the lungs.

One solution to the problem, which has long been proposed, could lie in regeneratable particle filters which, however, for regeneration at low exhaust temperatures require an additive, such as for example cerium, Na—Sr mixture or Fe—Sr mixture in the fuel, which acts as a catalyst for the oxidation of particulates (FR 2 771 449 A). Such catalysts act, for example, by first of all being oxidized themselves and then transferring the oxygen to the particulates.

In practical use, however, the oxides are only partially reduced by the particulates, so that there is a problem with catalyst ash blocking the filter in long-term operation. Additional problems arise with sulfur-containing fuels as a result of catalytically promoted sulfate formation. Furthermore, in urban traffic the problem whereby the exhaust-gas temperature is not sufficient for regeneration despite the use of a catalytic additive may arise.

On the other hand, purely thermal regeneration cannot be used, since this requires the engine to be briefly run at operating points with a greatly increased exhaust-gas temperature or requires electrical measures to be taken to heat the filter. For this purpose, EP 0 635 625 A1 discloses microwave heating of the filter ceramic, and EP 0 731 875 discloses an electrically heated oxidation catalytic converter for breaking down particulates. Each of these purely thermal measures entails a greatly increased mean fuel consumption. In addition, the combustion of the particulates initiated by these measures can cause the particulate filter to burn through locally, leading to it being destroyed.

By combining these two measures, it is possible to achieve an improvement, but this still does not solve the problem of the filter becoming blocked by catalyst ashes. Furthermore, under extreme circumstances (short-distance drives in urban traffic), the exhaust-gas temperatures may still remain so low that regeneration of the filter is nevertheless not possible.

To solve the problems relating to particulate emissions, plasma processes have been proposed or investigated a number of times in the past and can be classified as follows:

(a) Particles are electrically charged by treatment with a spray discharge, are electrostatically separated out and are oxidized on the substrate by plasma processes, if appropriate with the addition of a catalyst in the fuel or in the substrate (EP 0 332 609 B1, WO 91/03631 A1, U.S. Pat. No. 4,979,364 A; EP 0627 263 A1, DE 2 146228 A1).

(b) Particles are agglomerated by treatment with a spray discharge and are separated out by a cyclone (DE 34 24 196 A1 and EP 0 824 376 A1), where they are disposed of, for example thermally.

(c) Particles are separated out in a dielectric fixed bed of granules, in a fiber composite (felt) or in a porous material (ceramic foam or the like) as a filter. A non-thermal plasma is burnt in this porous structure, continuously regenerating the surfaces (WO 99/38603 A1).

(d) Plasma-induced regeneration of particulate filters can also be achieved if, in a non-thermal plasma, NO is oxidized to form $NO_2$, which even at low temperatures is reduced again to form NO, with the particulates being oxidized. Given sufficient exhaust-gas temperatures, it is also possible to use an oxidation catalyst instead of the plasma (DE 198 26 831 A1 and EP 341 832 B1).

(e) Particles are separated out on structural electrodes of a DBD reactor, where DBD stands for dielectric barrier discharges) by inertia forces and are then oxidized by the action of non-thermal plasma (DE 100 07 130 A0).

(f) As they flow through a porous ceramic which acts as a filter, particles are retained and are oxidized by the action of a DBD plasma (DE 197 17 890 A1). According to one aspect of the invention, the DBD plasma is formed between a counterelectrode, which is provided with a barrier layer, and a gas-permeable electrode, which is connected to the filter ceramic, or a filter ceramic of sufficient electrical conductivity as an electrode.

The following comments should be noted in connection with these processes:

Re. a) The electrostatic separation of particles requires two plasma reactors—a first for electrically charging the particles proportionally to their mass, and a second for electrostatic separation and catalytic or plasma-induced oxidation. In a compact structure which is suitable for motor vehicles, this function cannot reliably be ensured. There is a risk of uncontrolled deposition of the particles at locations in the exhaust section at which their oxidation is not ensured. This can lead to sudden, uncontrolled release of large quantities of particles (re-entrainment).

Re. b) Even with electrostatic agglomeration, it is impossible to ensure that the particles are subsequently separated out in a controlled manner. This results in the same problems as those involved in electrostatic separation in (a).

Re. c) The separation of particulates in continuously plasma-regenerated porous structures has a good effect. However, there are problems with the long-term mechanical strength of the porous structure when used in vehicles (granules, fiber material) or with the dynamic pressure (ceramic foams).

Re. d) The continuous regeneration of particulate filters by an upstream plasma works in principle but requires the presence of sufficient quantities of NO in the exhaust gas and is disadvantageous in terms of energy (B. M. Penetrante et al.: Feasibility of Plasma Aftertreatment for Simultaneous Control of NOx and Particulates; SAE paper No. 1999-01-3637).

Re. e) Since the electrode structure is pervious to the exhaust gas, a low dynamic pressure does result and there is little likelihood of the exhaust-gas cleaning element becoming blocked by solid deposits, but since inertia forces drop as the mass falls, light particles substantially follow the gas flow and are therefore not separated out to a sufficient extent.

Re. f) With dielectric barrier discharges, a significant proportion of the power is converted in the volume. The remainder of the electric power can be converted on electrically insulating surfaces, such as the dielectric coating at what is known as the root of the discharge filament formed at atmospheric pressure. Therefore, in the case of an electrically conductive porous filter ceramic, a root of this type forms only on the dielectric of the gas-impermeable counterelectrode. Chemically active free radicals, such as the atomic oxygen O formed from atmospheric oxygen and the hydroxyl radical OH formed from water, are known to have a very short lifespan in exhaust gas, of less than 200 µs. Consequently, there is little likelihood of free radicals which are formed in the volume oxidizing particulates which have been separated out on the filter ceramic. This reduces the efficiency of the plasma regeneration. Moreover, the proposed electrode geometries greatly restrict the cross section of flow of the individual filter passages. To keep the dynamic pressure of the plasma-regenerated filter at a low level, it is necessary to increase the volume compared to filters without these electrode structures.

SUMMARY OF THE INVENTION

Therefore, it is an object of the invention to provide a method and an associated system which can render the particle emissions from diesel engines harmless more effectively than has hitherto been possible.

In the text which follows, both the description and the claims use the technical term "non-thermal surface creeping discharge". Unless expressly stated otherwise, the expressions "surface creeping discharge" and "creeping discharge" are also to be understood as meaning this term. These terms need to be defined in more detail here in order to delineate them from other forms of electric gas discharges: the "non-thermal surface creeping discharge" in the text which follows is an electric gas discharge which burns in contact with a surface, generally an electrically insulating (or only slightly electrically conductive) surface
for generating a "non-thermal plasma"
while substantially avoiding gas heating.

The "non-thermal plasma" differs from the "thermal plasma" through the fact that the plasma state cannot be described thermodynamically by a temperature and that the mean energy of the electrons is significantly greater than that of the heavy particles (ions, atoms, molecules). At atmospheric pressure, non-thermal plasmas can be generated for example by electric gas discharges in which the introduction of energy is limited to very short times. As a result, electrons can ionize, electrically excite and split (dissociate) molecules without the gas temperature being significantly increased. At atmospheric pressure, surface creeping discharges often burn as sparks in which, however, the burning duration and power density are so high that substantial gas heating still occurs. This form of surface creeping discharge is specifically excluded from the present invention.

The invention proposes a method which combines the separation of particulates by ceramic particulate filters with the regeneration of the filters by non-thermal surface creeping discharges. Ceramic particulate filters are known to ensure a high level of separation efficiency of even fine particles. The surface creeping discharges allow the electrical energy in the immediate vicinity of the particulates separated out to be used to form oxidizing free radicals. As a result, there is a high probability of these free radicals reacting with the particulates and therefore also a high energy efficiency.

The electrode structures required for a method according to the invention can (a) both be embedded in the filter walls, (b) be applied to opposite sides of the filter walls as surface electrodes, (c) alternately be formed as embedded electrodes and as surface electrodes. This allows a low flow resistance to be achieved with a compact structure of the filter element.

According to one aspect of the invention, the filter walls are formed of a finely porous ceramic material of low electrical conductivity. As a result, the filter wall acts as a dielectric barrier which prevents a direct flow of current. Therefore, it is proposed to operate with a high voltage which changes over the course of time, either in the form of an alternating voltage or in the form of a pulsed voltage which repeats itself over the course of time. The mean electrical power converted into surface creeping discharges results from the product $E_{dis}$ x f of electrical energy $E_{dis}$ dissipated per pulse or per period and pulse repetition rate or frequency f. The dissipated energy $E_{dis}$ increases as the voltage amplitude $U_0$ rises. The pulsed voltage is characterized in that the duration of the voltage pulse is short compared to the period given by the pulse repetition frequency. As a result, the energy is introduced in targeted fashion into the generation of non-thermal surface gas discharges, and there is no excessive dissipation of electrical energy as a result of the residual conductivity of the filter ceramic and as a result of conductive particulate deposits on the filter.

The electrode structures can be produced by embedding wires of ductile materials, such as copper or nickel, during production of the filter. To avoid high-energy sparkovers through the porous filter ceramic, the electrode wires may be coated with a barrier layer of glass, enamel or densely sintered ceramic. An alternative to producing electrode structures is locally doping the filter ceramic with additives in order to increase the electrical conductivity. Contact is made with the individual electrodes for connection to electric ground and high voltage from opposite ends of the filter. This can be achieved, for example, by grid-connection of the electrodes or by a perforated contact place which leaves clear the entry-side and exit-side openings of the filter cells.

The plasma regeneration of the filter may take place continuously. The mean plasma power required is represented by a function which drops as the filter temperature rises and rises as the emission of particulates rises. As an alternative to particulate emission, it is also possible for the exhaust-gas back pressure to be used as an input variable for controlling the mean plasma power. The advantage of this method lies in the fact that the exhaust-gas back pressure can be continuously kept at a low level. As a result, the increased fuel consumption which may occur in internal combustion engines as a result of a rising exhaust-gas back pressure is substantially avoided. On the other hand, this does result in an increased outlay on energy for operation of the plasma. The energy content of hydrocarbons and particulates is in practice not used for the regeneration.

Therefore, an alternative is cyclical plasma regeneration. Exhaust-gas back pressure and filter temperature are used as criteria for the initiation and the plasma power used for regeneration.

To limit the mean energy outlay required for plasma regeneration, there is provision for the filter ceramic to be doped with catalytic materials which promote the oxidation of particulates and hydrocarbons. Precious metals such as Pt, metals such as Fe, and alkaline earth metals such as Ca, are suitable for this purpose. In this case too, it is possible to utilize two different regeneration strategies. In the case of continuous plasma regeneration, the result is an electric power which is more or less greatly reduced, as a function of the temperature, compared to the oxidation of particulates in the non-catalytic situation. In the case of cyclical regeneration, plasma regeneration is required when the filter temperature remains below the level required for catalytic regeneration for a prolonged period of time.

The plasma regeneration of particulate filters can furthermore be combined with measures for promoting the selective catalytic reduction of nitrogen oxides using ammonia-containing reducing agents.

For this purpose, the electrode structure is configured in such a way that bulk dielectric barrier discharges instead of surface discharges burn on the outlet side of the filter. The dielectric barrier discharges partly convert NO into $NO_2$, which induces the selective catalytic reduction of NO at low temperatures of less than 200° C.

Furthermore, by selecting the catalytic doping of the filter material, it is possible to enable the plasma-induced catalytic reduction of nitrogen oxides by hydrocarbon-containing reducing agents to take place in the particulate filter itself. In both cases, the control strategy for plasma operation should additionally be matched to the requirements of the NOx reduction.

BRIEF DESCRIPTION OF THE DRAWINGS

These and other objects and advantages of the present invention will become more apparent and more readily appreciated from the following description of exemplary embodiments, taken in conjunction with the accompanying drawings of which:

FIG. 1 diagrammatically depicts two sections through a particulate filter in accordance with the prior art, FIG. 2 to FIG. 4 diagrammatically depict three different options for generating surface creeping discharges on ceramic, FIG. 5 diagrammatically depicts sections through an arrangement as shown in FIG. 1 which are provided with means for forming the surface creeping discharges, FIG. 6 diagrammatically depicts a graph illustrating the efficiency, FIG. 7 to FIG. 12 diagrammatically depict sections through or excerpts of filter structures with suitable electrodes for forming surface creeping discharges, FIG. 13 diagrammatically depicts a cross section through a particle filter with corresponding structures and with an associated control means also being present, FIG. 14 diagrammatically depicts a particle filter as shown in FIG. 13 in combination with a reactor for carrying out a selective catalytic reduction (SCR), and FIG. 15 diagrammatically depicts a graph illustrating the selection of the voltage for the creeping discharge as a function of exhaust-gas parameters.

DETAILED DESCRIPTION OF THE PREFERRED EMBODIMENT

Reference will now be made in detail to the preferred embodiments of the present invention, examples of which are illustrated in the accompanying drawings, wherein like reference symbols refer to like elements throughout. Some of the figures are described jointly.

The method described below for reducing the levels of particulate emissions is based on the following assumptions:

To ensure efficient breakdown by oxidation, the particulates have to be collected on surfaces. This is most reliably ensured by the particulate filters which are known.

Oxidation which is effective even at low temperature without the addition of catalytic additives can only be achieved by oxidizing free radicals which are formed in the immediate vicinity of the surface. This can be induced with a good level of efficiency by electron collisions for example with oxygen in a non-thermal plasma:

$$O2+e \rightarrow O+O+e \quad (1)$$

The oxygen free radicals react with the carbon surface C(s) and in the process form surface-bonded carbon monoxide:

$$O+C(s) \rightarrow CO(s) \quad (2)$$

The carbon monoxide may be released $$CO(s) \rightarrow CO \quad (2a),$$

but may also react with a further free radical to form carbon dioxide:

$$CO(s)+O \rightarrow CO_2 \quad (3)$$

If the free radicals are generated at an excessive distance from the surface, they react with constituents RX of the exhaust gas (such as for example hydrocarbons)

$$RX+O \rightarrow RO+X \quad (4),$$

before they reach the surface and therefore make no contribution or only an indirect contribution, which is highly dependent on the exhaust-gas composition, to the breakdown of particulates.

The most efficient way of generating non-thermal gas discharges with the required properties is surface creeping discharges. Solid electrode structures integrated in the filter ceramic offer significant advantages over separate electrodes or bulk-bead arrangements: they are mechanically stable, are favorable in terms of fluid dynamics and can therefore be of compact structure.

Figure 1A:
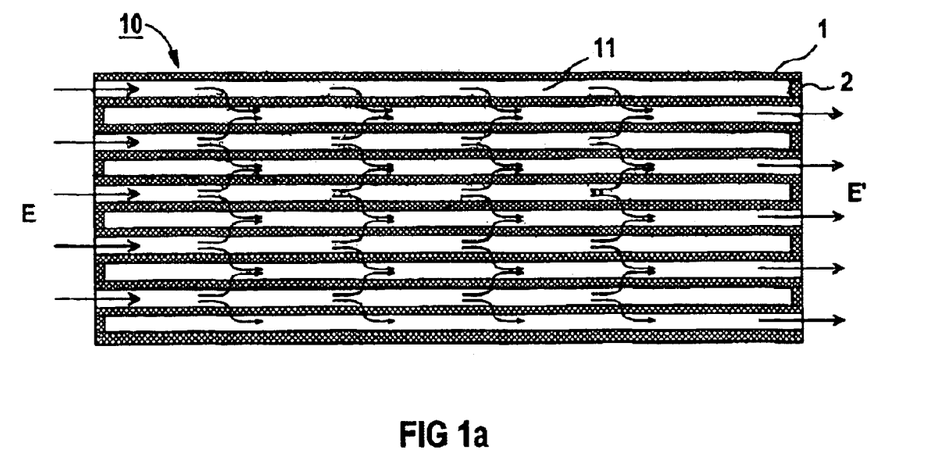
Figure 1B:
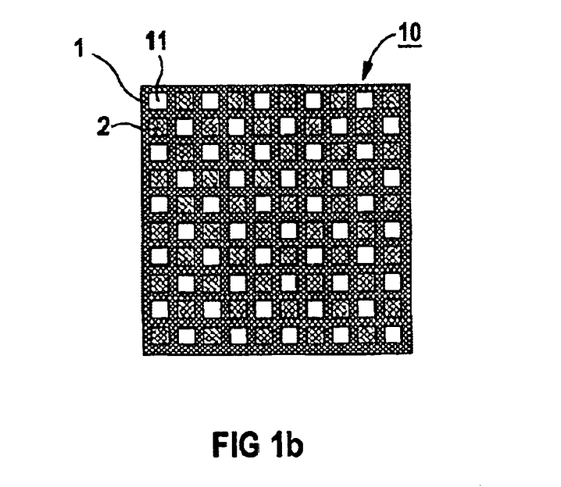

FIG. 1a shows a longitudinal section, and FIG. 1b a cross section, through a typical particulate filter 10. The filter 10 has cells 11 with walls 1 made from open-cell ceramic material which are alternately dosed up at one end by a ceramic cover 2. The exhaust gas E flows through the side walls of the cells. In the process, the particulates are separated out on the surface.

Figure 2:
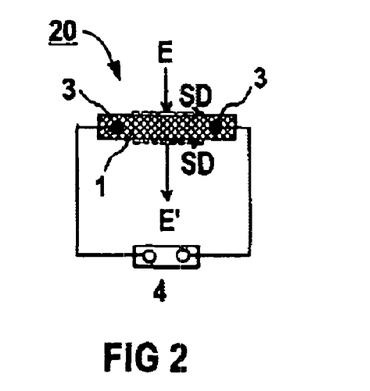

FIG. 2 clarifies the method described above with reference to a structure 20 with two electrodes 3 which are embedded in a filter ceramic 1 and are connected to a voltage source 4 for generating a high voltage which varies over the course of time. The high voltage which varies over the course of time may be an alternating voltage or a pulsed voltage which repeats itself over the course of time. The particulate-containing exhaust gas E passes through the filter ceramic wall 1. In the process, particulates are separated out at the filter ceramic 1. The particulate-filtered exhaust gas E' leaves the filter ceramic on the opposite side. Surface creeping discharges SD are formed on both sides of the filter ceramic.

Figure 3:
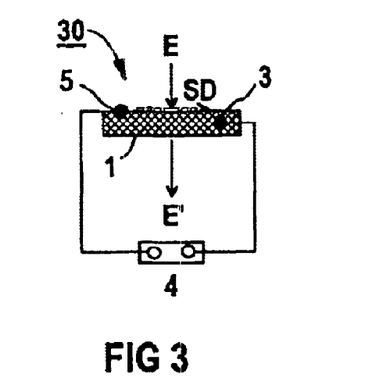

FIG. 3 shows a structure 30 with an electrode 3 embedded in the filter ceramic and an electrode 5 resting on it. In this case, a surface creeping discharge SD is formed only on that side of the filter ceramic on which the electrode 5 is located. As a result, the introduction of electrical energy can be limited to regions in which particulates are deposited.

Figure 4:
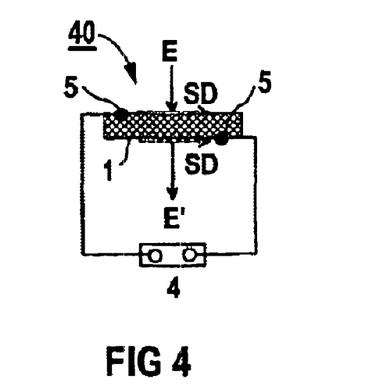

FIG. 4 shows a structure 40 with two electrodes 5 resting on opposite sides of the filter ceramic 1. As with the arrangement shown in FIG. 2, in this case surface creeping discharges are formed on both sides of the filter ceramic.

Figure 5A:
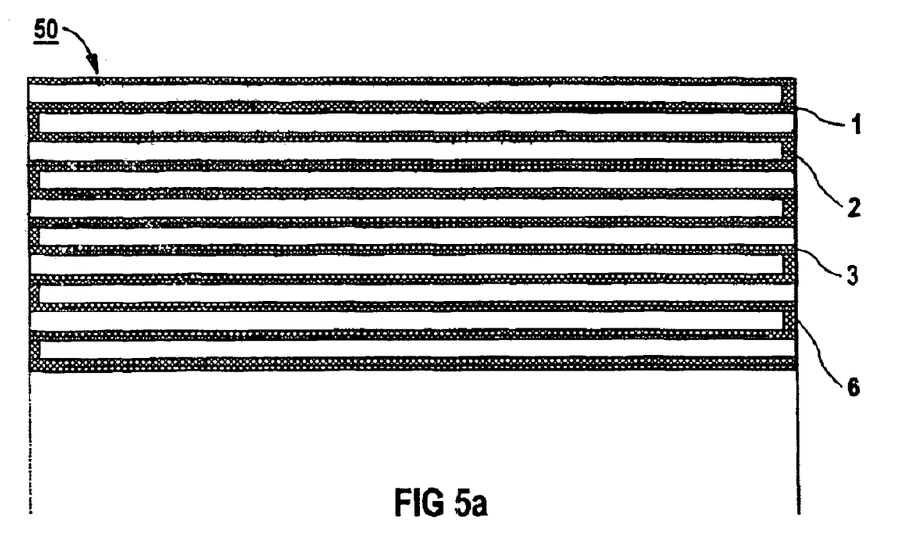
Figure 5B:
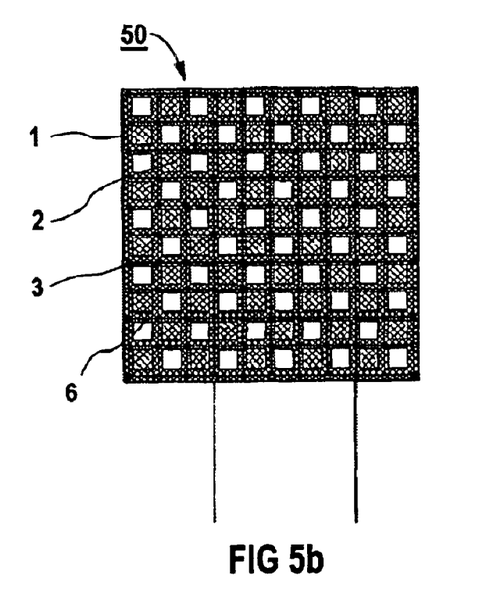

FIG. 5a shows a longitudinal section and FIG. 5b a cross section through a plasma-regenerated filter 50 with embedded electrodes 3. The electrodes 3 of the same polarity are connected to one another by wiring 6. A comparison between FIG. 1 and FIG. 5 in both cases shows a honeycomb structure with cells which are closed off at alternate ends.

A suitable filter material is known to be cordierite, silicon carbide (SiC) and what is known as NZB ($NaZr_2P_3O_{12}$), in each case with additives for adjusting the electrical conductivity in order to achieve suitable electrical properties.

Figure 6:
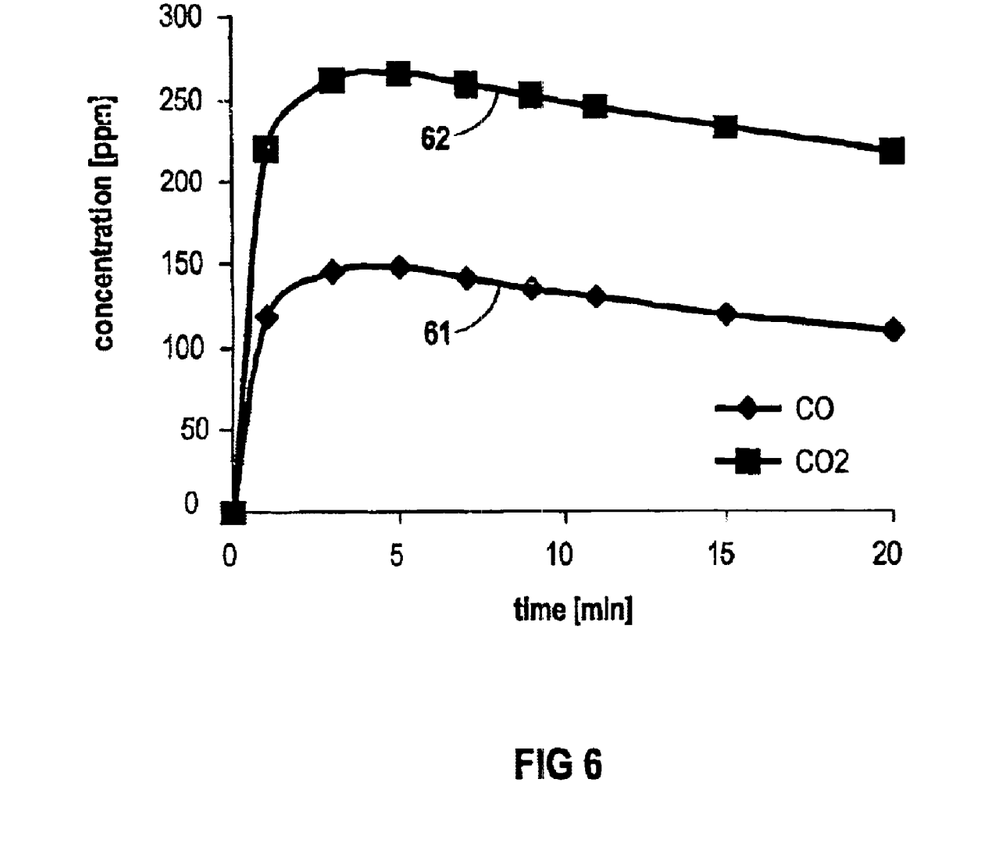

FIG. 6 shows the experimental detection of the oxidation of particulates which have been deposited on surfaces with reference to the formation of CO and $CO_2$ as a result of surface creeping discharges in air at room temperature. The concentration of carbon monoxide (CO) and carbon dioxide ($CO_2$) in the exhaust gas of the surface creeping discharges in ppm is plotted on the ordinate, and the time in minutes is plotted on the abscissa. Curve 61 denotes the CO content and curve 62 the $CO_2$ content as a function of time. It can be seen that both curves, after the rapid rise immediately after the surface creeping discharges have been switched on at time 0 continue to rise slowly, pass through a maximum and then drop again. The slow rise is attributable to the increase in the concentration of the CO which has been adsorbed at the surface of the particulates up to a saturation value, and the maximum and drop are attributable to the ongoing decrease in the adsorbed mass of particulates resulting from oxidation.

Figure 7:
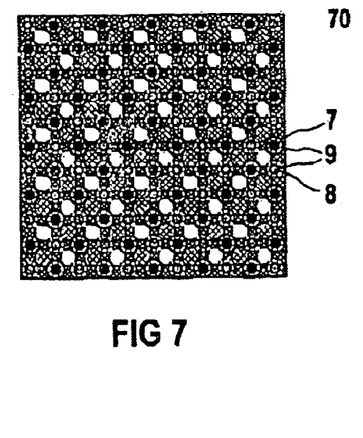

FIG. 7 shows a cross section through a plasma-regenerated filter 70 with dielectrically coated embedded electrodes 7 and counterelectrodes 8. The dielectric coating 9 prevents the direct flow of current between electrodes 7 and counterelectrodes 8. It is optionally also possible to dispense with the dielectric coating of either the electrodes 7 or the counterelectrodes 8.

Figure 8:
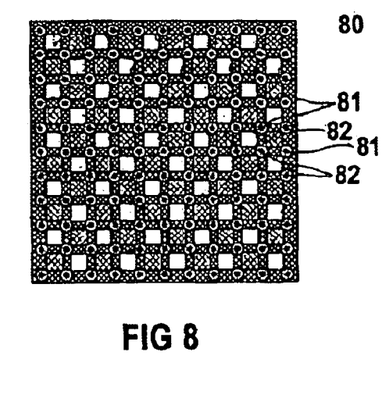

FIG. 8 shows a cross section through a plasma-regenerated filter 80 with electrode structures made from ceramic and with an increased conductivity both for the electrodes 81 and for the counterelectrodes 82 which are integrated in the filter.

Figure 9:
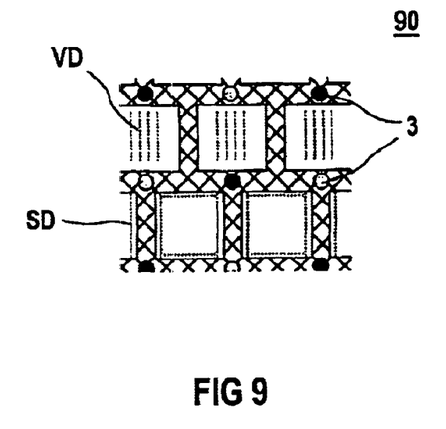

FIG. 9 shows an excerpt of a plasma-regenerated filter 90 in which, as a result of rows being laterally offset with respect to one another, surface discharges SD burn in some of the cells and volume discharges VD burn in others of the cells. Electrodes 3 without a dielectric coating were used here by way of example. This arrangement is suitable for the oxidation of particulates on one side of the filter ceramic and for oxidation of NO to form $NO_2$ on the other side of the filter ceramic.

Figure 10:
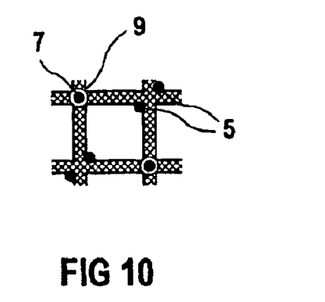
Figure 11:
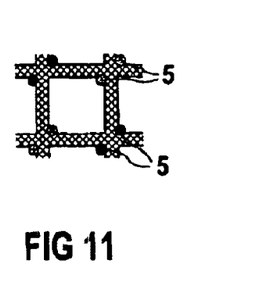

FIG. 10 shows an excerpt from a plasma-regenerated filter with embedded, dielectrically coated electrodes 7 and metallic electrodes 5 resting on the surface, in accordance with the principle shown in FIG. 3. FIG. 11 represents an excerpt from a plasma-regenerated filter with metallic electrodes 5 resting on it in accordance with the principle shown in FIG. 4. It is clear from both illustrations that surface creeping discharges can be generated in the honeycomb cells of a honeycomb body.

Figure 12:
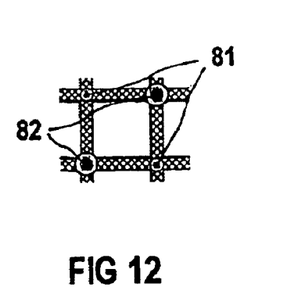

FIG. 12 shows an excerpt from a plasma-regenerated filter with alternating embedded electrodes 81 and open electrodes 82, which are formed by filter ceramic with a locally increased conductivity. The electrically conductive region of the ceramic at the embedded electrode is selected to be so small that it is completely surrounded by insulating ceramic, while for the counterelectrode it is selected to be sufficiently large for regions of sufficiently high electrical conductivity to be present at the surface.

Figure 13:
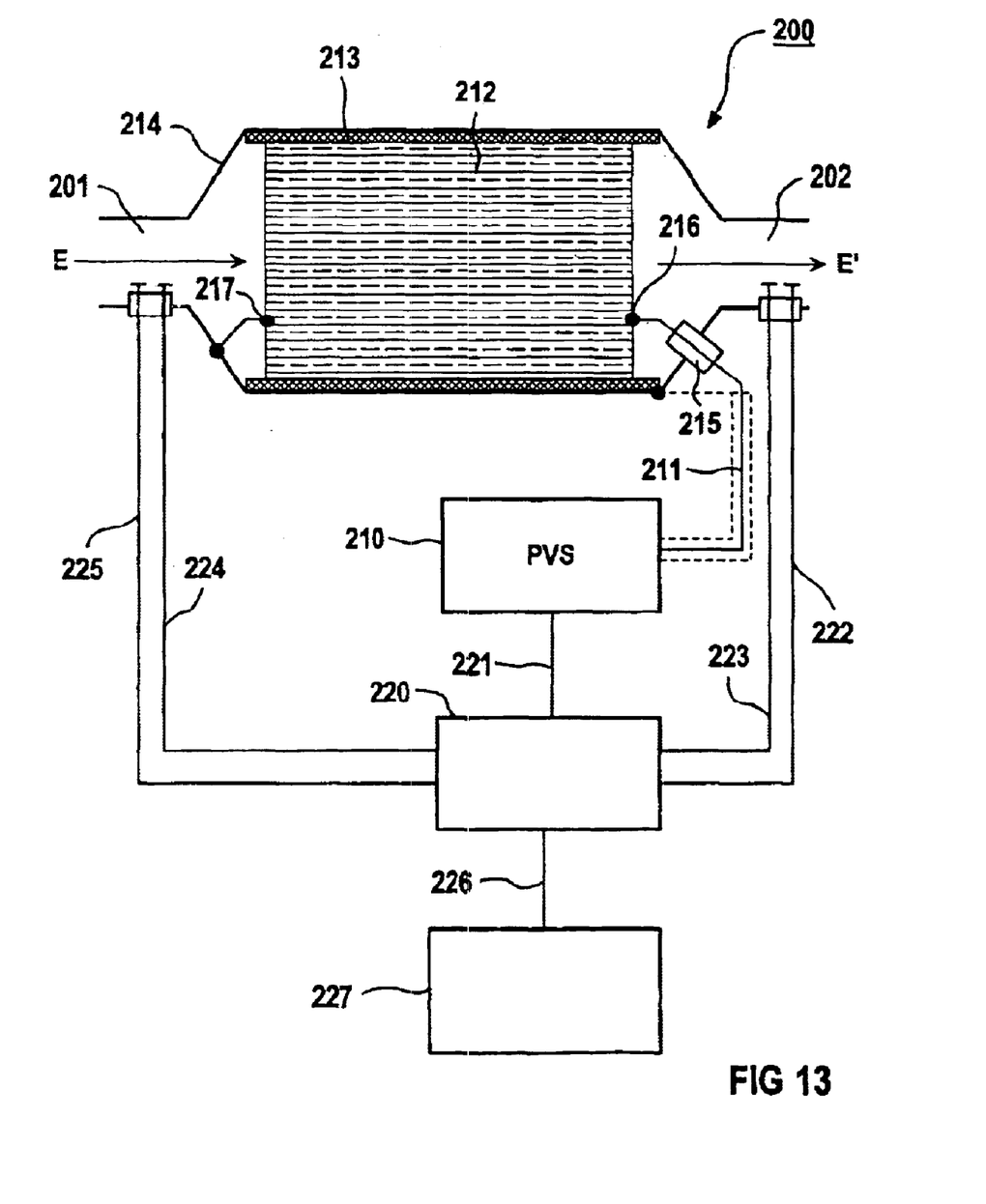

In FIG. 13, a device for applying non-thermal gas discharges to diesel exhaust gases is denoted by 200. In the device 200 having an inlet 201 for untreated exhaust gas E and an outlet 202 for treated exhaust gas E', there is one of the filter systems which have been described in detail above. There is a pulsed voltage source (PVS) 210, which is used to generate a high voltage of suitable amplitude and frequency. The high-voltage source 210 is connected via a coaxial cable 211 to the plasma filter unit 212 which is fitted into the metallic filter casing 214 through an electrically and thermally insulating, impact-absorbing mat 213. The inner conductor, which carries high voltage, of the coaxial cable 211 is connected to the electrode side 216 of the plasma filter unit 212 via a high-voltage leadthrough 215, while the counterelectrode side 217 of the plasma filter unit 212 and the outer conductor are connected to the filter casing 214, which is used as a common electrical grounding point.

A control unit 220 is used to actuate the PVS 210 via a control cable 221. Input variables used for the control unit 220 are in particular pressure and temperature. For this purpose, two sensors 222 and 223 for $P_{in}$, on the one hand, and $T_{in}$ on the other hand, are present upstream of the diesel particle filter in the system, and two sensors 224 and 225 for $P_{out}$, on the one hand, and $T_{out}$ on the other hand, are present downstream of the diesel particle filter 200 in the system. Furthermore, the control unit 220 may have devices for storing and evaluating engine-related characteristic diagrams which can be transmitted from the engine management system 227 via a data line 226.

In addition, details of the electrical operational reliability and of the electromagnetic compatibility and of the individual measures provided to resolve these matters are also described:

Since the inlet surface of the filter and other surfaces on the entry side of the filter are covered with particulates during operation, reducing the dielectric strength, the high-voltage leadthrough 215 through the metallic reactor casing 214 and the high-voltage connection of the plasma filter unit 216 are preferably formed on the exit side of the filter.

The design of the reactor casing 214, in particular in terms of electrical ground connections and electrical conductivities, is effected in such a way that the interference caused by pulsed currents in the plasma filter unit is electromagnetically screened: for this purpose, materials of high electrical conductivity are selected and all the ground connections 217 are designed to be of low inductance and with a large surface area in order to avoid the skin effect. Typical values for the electrical conductivity are between 5 Sm/mm2 and 65 Sm/mm2. To ensure electromagnetic compatibility, the metallic housing may also be formed of an inner, chemically inert layer of low conductivity and an outer layer of high electrical conductivity. Typical values for connection inductances of ground connection 217 and high-voltage connection are between 10 nH and 10 $\mu$H.

Finally, to avoid inevitably irreversible disruption to the plasma filter unit, electrodes with a suitable volume resistance are used, and, in the event of a local breakthrough of gas discharges through the filter material by a rise in the voltage drop across the electrode limit, the current and therefore the power converted in the material to an acceptable fraction of the total current or the total power. This fraction is expediently selected to be so low that the current or power per channel, in the event of a fault, does not exceed 10 times the normal current or the normal power. It is particularly advantageous for both the high-voltage electrodes and the counterelectrodes connected to ground to have this resistivity, in order to rule out electrical sparkovers at the ends.

In addition to the simple protecton function, in the system described in FIG. 13, in particular undesirable EMC problems are also prevented by the avoidance of current peaks. Furthermore, the resistive connection of the individual particulate filter channels is responsible for making the introduction of power more uniform across the filter cross section, since the power-limiting action of the electrode resistance limits not only the local introduction of power in a particulate filter channel itself but also the introduction of power in the entire channel.

Suitable values for the resistivity of the electrically insulating mat 213 are between 100 W/cm electrode length and 100 kW/cm electrode length, preferably values of between 1 kW/cm and 10 kW/cm electrode length.

Figure 14:
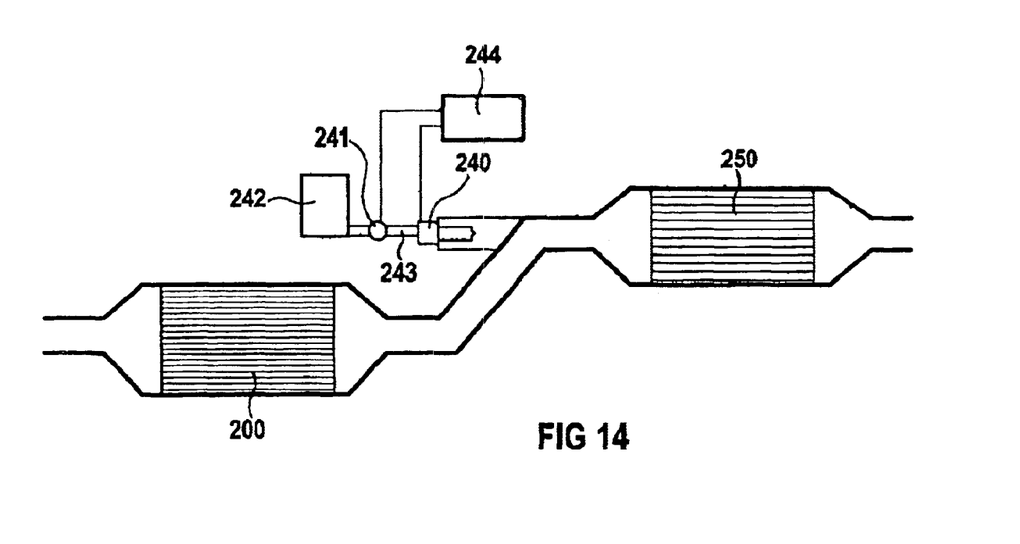

In FIG. 14, the plasma filter device 200 illustrated in FIG. 13 has been combined with a reactor 250 for selective catalytic reduction SCR. Between the outlet of the plasma filter device 200 and the inlet of the SCR reactor 250 there is an injection nozzle 240 for injecting a reducing agent RA which is supplied from a storage tank 242 via a pressure line 243 by a pump 241. The pump and valve are actuated by a control unit 244 on the basis of sensor and characteristic curve data. To control the mean electric power converted in the surface creeping discharges, the following strategy is used: the starting point is a minimum power $P_{min}$ for a pressure drop at the filter which is below a threshold value $\Delta p_1$. When $\Delta p_1$ is exceeded, the power is increased proportionally to the temporal pressure increase dp/dt up to a pressure- and temperature-dependent maximum value $P_{max}(p_{in}/T_{gas})$. The power is held at that level until the pressure has dropped back to the threshold value $\Delta p_1$. For cyclical regeneration, the mean electric power converted in the surface creeping discharges is controlled according to the following strategy: as long as the pressure drop at the filter is below a threshold value $\Delta p_1$, no power is introduced. When $\Delta p_1$ is exceeded, the power is increased proportionally to the temporal pressure increase dp/dt up to a pressure- and temperature-dependent maximum value $P_{max}(p_{in}/T_{gas})$. The power is held at this level until the pressure drops to the threshold value $\Delta p_1$.

In combination with measures for nitrogen oxide reduction, this control strategy can be combined with a strategy for the plasma-induced oxidation of NO to form $NO_2$. Methods for plasma-enhanced selective catalytic reduction are characterized in that at low temperatures the reduction of $NO_2$ preferentially takes place with hydrocarbon as reducing agent or, in the case of ammonia of ammonia-containing reducing agents, $NO_2$ allows the reduction of NO at low temperatures. The rate $R_{ox}$ of the plasma-induced conversion of NO into $NO_2$ is proportional to the mean plasma power. Therefore control is effected in such a way that the minimum plasma power $P_{min}$ is set proportionally to the required rate $R_{ox}$ of NO conversion, as long as regeneration of the particulate filter is not required. For regeneration, the maximum of the powers required for regeneration and NO conversion is set.

The power is set by selecting a suitable voltage amplitude $U_0$ and a suitable frequency or pulse repetition rate f: it is known that a minimum voltage, the ignition voltage, is required to ignite a gas discharge. With non-thermal gas discharges of the type used here, above this ignition voltage the current amplitude and therefore the energy which is dissipated per pulse or per period rise considerably. To avoid thermal effects resulting from high electrical power densities in the gas discharge, it is advantageous to limit the current by setting a suitable voltage amplitude. The ignition voltage of a gas discharge varies considerably with pressure and temperature, while the reduced ignition field strength E/N formed as a quotient from the electrical field strength E and the numerical particle density N is only slightly dependent on these variables. It is therefore advantageous to control the voltage amplitude U0 as a function of pressure and temperature. A further result is that the voltage amplitude rises approximately linearly with the electrode spacing. Therefore, for filters which can be used in practice, minimum ignition voltages of approx. 3 kV result. By contrast, voltages of 20 kV should not be exceeded for safety reasons. Pulse repetition rates or frequencies of at least 100 Hz and at most 200 kHz are suitable for this application.

Figure 15:
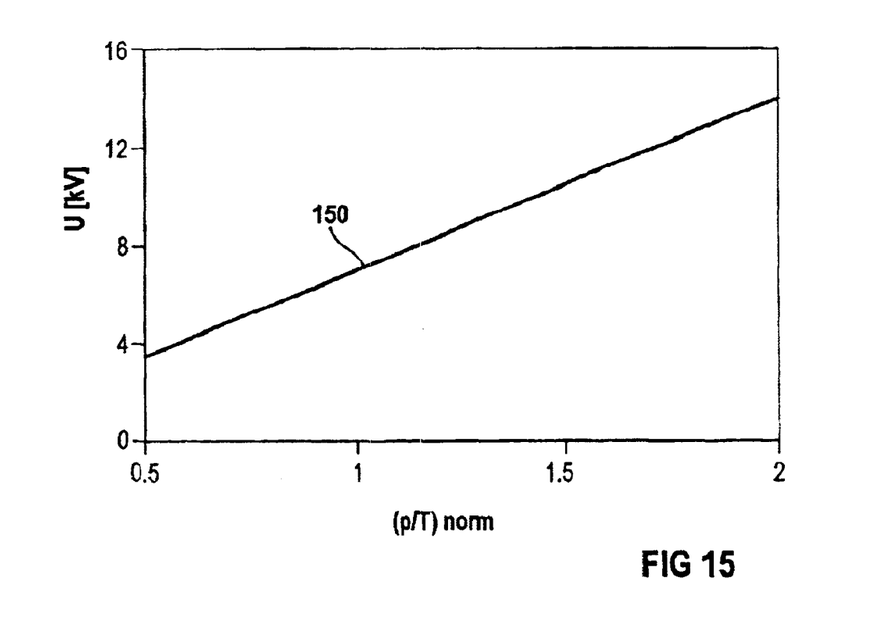

FIG. 15 shows a characteristic curve for the setting of a suitable amplitude for a pulse voltage U0 in kV as a function of the quotient pin/Tin normalized to standard pressure p0 (1013 hPa) and standard temperature T0 (273.15 K). This illustration advantageously results in an approximately linear characteristic curve 150, thus simplifying control. The characteristic curve 150 is stored directly in the memory of the control device 220.

The same statements as have been made in connection with excitation with pulsed voltages also apply correspondingly to electrical excitation with alternating voltages; in this case, the amplitudes of the voltages are to be taken as the difference between the maximum and minimum voltages (peak-to-peak).

It is clear to the person skilled in the art that further combinations of geometries with different types of electrodes are possible. It will also be clear that these geometries can also be combined with catalytic materials for promoting oxidation.

The invention has been described in detail with particular reference to preferred embodiments thereof and examples, but it will be understood that variations and modifications can be effected within the spirit and scope of the invention.

What is claimed is:

1. A method for reducing carbon-containing particle emissions from a diesel engine, comprising:

routing exhaust gas emitted by the diesel engine through a filter;

separating out particles contained in the exhaust gas at filter surfaces; and oxidizing the particles which have been separated out for regeneration of the filter initiated by non-thermal, electric surface creeping discharges selectively generated at the filter surfaces occupied by the particles.

2. The method as claimed in claim 1, wherein said oxidizing includes generating the surface creeping discharges in each case between two electrodes embedded in a dielectric filter material of low electrical conductivity.

3. The method as claimed in claim 1, wherein said oxidizing includes generating the surface creeping discharges in each case between an electrode, embedded in a dielectric filter material of low electrical conductivity, and a counterelectrode, arranged on a filter surface facing the exhaust gas flowing in.

4. The method as claimed in claim 1,
wherein the filter includes a dielectric filter material forming a dielectric barrier, and
wherein said oxidizing includes generating the surface creeping discharges in each case between one electrode, arranged on a filter surface facing the exhaust gas flowing in, and a counter-electrode, arranged on an outlet-side filter surface.

5. The method as claimed in claim 4, wherein said oxidizing is initiated by electrical excitation for the surface creeping discharge by one of an alternating voltage and a periodic pulse voltage having an amplitude of between 3 kV and 20 kV (peak-to-peak) and a frequency/pulse repetition rate of between 100 Hz and 200 kHz, with electric power control effected by adjusting amplitude and frequency.

6. The method as claimed in claim 5, wherein the amplitude is controlled as a function of pressure at a filter inlet over gas temperature.

7. The method as claimed in claim 5, wherein the frequency is selected as a function of filter occupancy and filter temperature.

8. The method as claimed in claim 7, wherein the filter occupancy is determined from pressure drop at the filter.

9. The method as claimed in claim 8, wherein said oxidizing producing the regeneration takes place cyclically.

10. The method as claimed in claim 9, further comprising controlling mean electric power converted in the surface creeping discharges by
establishing a starting point at a power value 0 for a pressure drop at the filter<threshold value $\Delta p_1$,
increasing power when $\Delta p_1$ is exceeded proportionally to the temporal pressure increase dp/dt up to a pressure-dependent and temperature-dependent maximum value $P_{max}(P_{in}/T_{gas})$,
holding the power at $P_{max}$ until the pressure has dropped to the threshold value $\Delta p_1$.

11. The method as claimed in claim 1, wherein said oxidizing producing the regeneration takes place continuously.

12. The method as claimed in claim 11, further comprising controlling mean electric power converted in the surface creeping discharges by
establishing a starting point at minimum power $P_{min}$ for pressure drop at the filter<threshold value $\Delta p_1$,
increasing power when $\Delta p_1$ is exceeded proportionally to a temporal pressure increase dp/dt up to a pressure-dependent and temperature-dependent maximum value $P_{max}(P_{in}/T_{gas})$,
holding the power at $P_{max}$ until the pressure has dropped to the threshold value $\Delta p_1$.

13. The method as claimed in claim 1, further comprising converting nitrogen monoxide into nitrogen dioxide after
a reduction in particle emissions by non-thermal gas discharges on an outlet side of the filter, and
selective catalytic reduction of the nitrogen oxides.

14. The method as claimed in claim 13, wherein said selective catalytic reduction includes metering a reducing agent required for said selective catalytic reduction downstream of the filter and upstream of a reduction catalytic converter.

15. A system for reducing carbon-containing particle emissions in exhaust gas from a diesel engine, comprising:
a ceramic particulate filter to separate out particles contained in the exhaust gas at filter surfaces; and
means for oxidizing the particles separated out at said ceramic particulate filter by initiating non-thermal, electric surface creeping discharges selectively generated at filter surfaces occupied by the particles.

16. The system as claimed in claim 15, wherein to initiate the electric surface creeping discharges said ceramic particulate filter includes electrode structures formed of electrodes and counterelectrodes at least partially integrated in said ceramic particulate filter.

17. The system as claimed in claim 15, further comprising:
a pulsed voltage source with controllable voltage amplitude and pulse repetition rate to supply the surface creeping discharges;
sensors to measure temperatures and pressures upstream and downstream of said ceramic particulate filter; and
a control unit with inputs for measurement signals from said sensors to receive the temperatures and pressures and nonvolatile memories storing control characteristic curves for controlling voltage amplitude and pulse repetition rate as functions of the temperatures and pressures.

18. A system for reducing carbon-containing particle emissions in exhaust gas from a diesel engine, comprising:
a ceramic particulate filter to separate out particles contained in the exhaust gas at filter surfaces;
means for oxidizing the particles separated out at said ceramic particulate filter by initiating non-thermal, electric surface creeping discharges selectively generated at filter surfaces occupied by the particles;
means for oxidizing gaseous pollutants by creating dielectric barrier discharges near an outlet of said ceramic particulate filter;
means for metering a reducing agent into the exhaust gas; and
means for selective catalytic reduction of -nitrogen oxides.

19. The system as claimed in claim 18, wherein to initiate the electric surface creeping discharges said ceramic particulate filter includes electrode structures formed of electrodes and counterelectrodes at least partially integrated in said ceramic particulate filter.

20. The system as claimed in claim 19, wherein at least one of the electrodes of each electrode structure is embedded in said ceramic particulate filter.

21. The system as claimed in claim 19, wherein the electrodes are embedded in said ceramic particulate filter and the counterelectrodes rest on said ceramic particulate filter.

22. The system as claimed in claim 19, wherein the electrode structures have metallic electrodes with a dielectric coating.

23. The system as claimed in claim 19, wherein the electrode structures are formed by filter material of high conductivity.

24. The system as claimed in claim 18, wherein said ceramic particulate filter has an exhaust-gas inlet and comprises cells, each rectangular in cross section, assembled to form a honeycomb structure with the cells closed off at alternate ends, arranged so that the cells open either toward the exhaust-gas inlet or toward the outlet.

25. The system as claimed in claim 24, wherein the cells within the honeycomb structure are arranged in lines, adjacent lines being offset with respect to one another by a width of half a cell.

26. The system as claimed in claim 18, wherein said ceramic particulate filter is formed of a porous ceramic comprising at least one of cordierite, silicon carbide and NZP (NaZr$_2$P$_3$O$_{12}$) with additives for adjusting conductivity and for catalytic oxidation of particulates.

27. The system as claimed in claim 18, further comprising:
- a pulsed voltage source with controllable voltage amplitude and pulse repetition rate to supply the surface creeping discharges and the dielectric barrier discharges;
- sensors to measure temperatures and pressures upstream and downstream of said ceramic particulate filter;
- means for determining NO concentration in the exhaust gas; and
- a control unit with inputs for measurement signals from said sensors to receive the temperatures and pressures and information relating to the NO concentration, and nonvolatile memories storing control characteristic curves for controlling voltage amplitude and pulse repetition rate as functions of the temperatures, the pressures and the NO concentration.

28. The system as claimed in claim 18, wherein said means for oxidizing the particles operates at high voltage.

29. The system as claimed in claim 28, further comprising a housing made from a material of high electrical conductivity of between 5 Sm/mm2 and 65 Sm/mm2 as a reactor casing.

30. The system as claimed in claim 29, further comprising insulation on an interior surface of the reactor casing formed of a thermally and electrically insulating material with a thickness of between 1 mm and 1 cm.

31. The system as claimed in claim 30,
- wherein the reactor casing includes a metallic wall, and
- wherein the insulating material used is densely sintered ceramic based on at least one of aluminum oxide, aluminum nitride, zirconium dioxide, boron nitride and cordierite with a wall thickness of from 0.5 mm to 10 mm which projects at least 5 mm and up to 50 mm beyond the metallic wall inside and outside the reactor casing.

32. The system as claimed in claim 31, wherein to initiate the electric surface creeping discharges said ceramic particulate filter includes electrode structures formed of electrodes and counterelectrodes at least partially integrated in said ceramic particulate filter, and at least one the electrodes and counterelectrodes in the electrode structure have a resistivity which limits current per channel upon an electrical breakdown through the filter material.

33. The system as claimed in claim 32, wherein the current is limited to ten times normal current.

34. The system as claimed in claim 32, wherein the electrodes and counterelectrodes have substantially identical resistivity.

35. The system as claimed in claim 32, wherein the resistivity is between 100 Ω/cm electrode length and 100 kΩ/cm electrode length.

36. The system as claimed in claim 35, wherein the resistivity is between 1 kΩ/cm electrode length and 10 kΩ/cm electrode length.

37. The system as claimed in claim 29,
- wherein said ceramic particulate filter includes high-voltage electrodes and a contact surface near the outlet of said ceramic particulate filter, and
- wherein the reactor casing includes a high-voltage leadthrough of high dielectric strength for feeding the high voltage to the high-voltage electrodes via the contact surface near the outlet of said ceramic particulate filter.

38. The system as claimed in claim 37, wherein said ceramic particulate filter has an inlet end face and includes counterelectrodes contacting the reactor casing near the inlet end face of said ceramic particulate filter, the reactor casing providing an outer ground.

39. The system as claimed in claim 38, further comprising a coaxial cable to feed the high voltage through the reactor casing, said coaxial cable having insulation material able to withstand temperatures of up to 250° C., an inner conductor connected to the high-voltage leadthrough and an outer conductor connected to the reactor casing.

* * * * *